Patented Aug. 30, 1932　　　　　　　　　　　　　　　　1,874,141

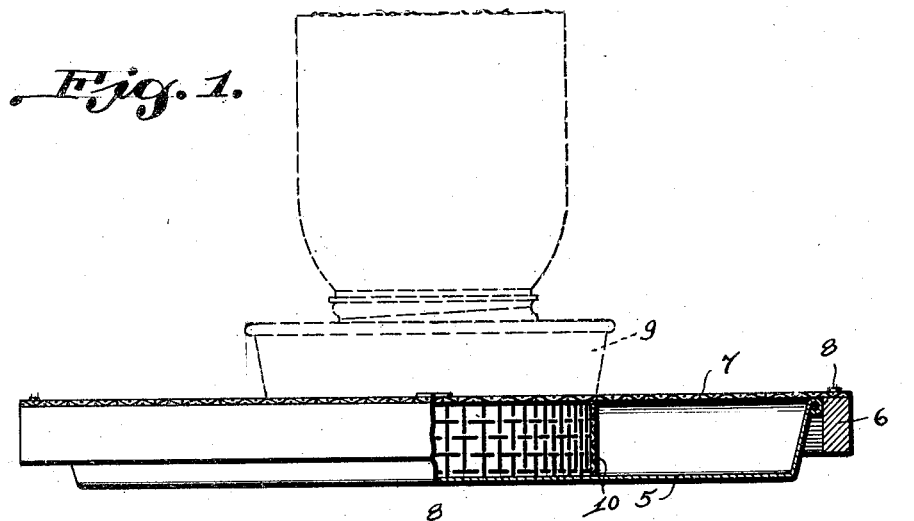
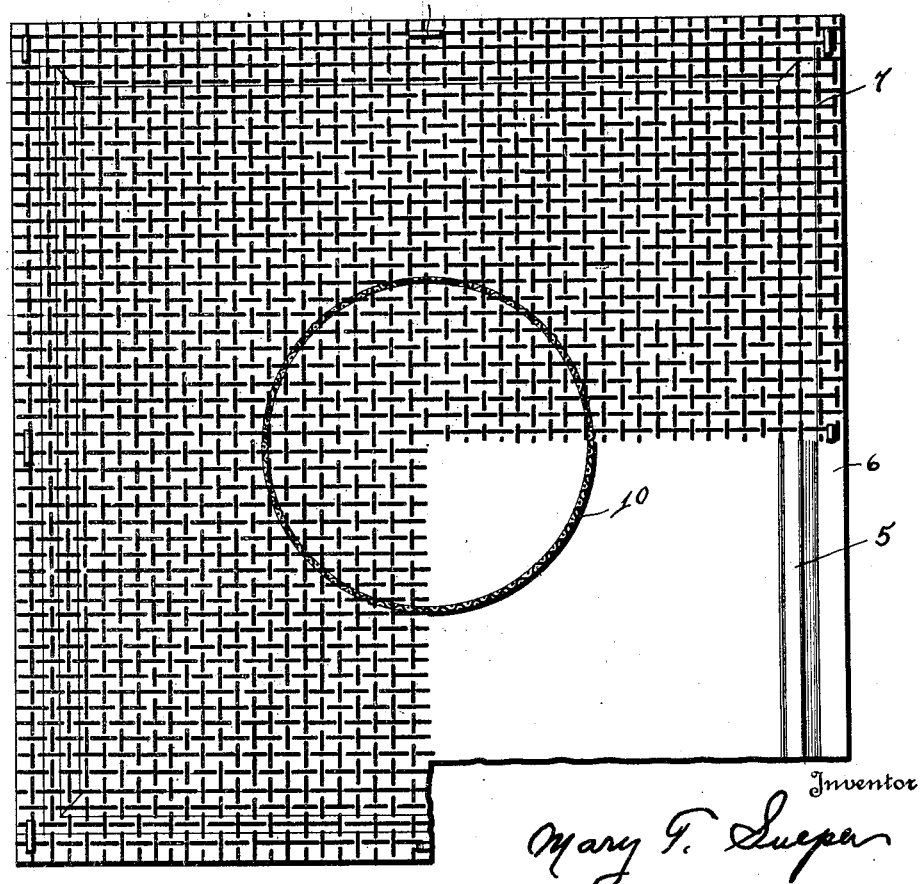

UNITED STATES PATENT OFFICE

MARY T. SUEPER, OF LINDSAY, NEBRASKA

CHICK PROTECTOR FOR WATERING DEVICES

Application filed August 12, 1931. Serial No. 556,467.

My invention relates to poultry watering devices, especially adapted for chicks and the like.

The primary object of the invention is to provide a watering device which will prevent the chicks from scratching dirt and litter into the drinking water and which will permit the chicks to stand around the drinking fount without getting their feet wet by the water which they spatter when drinking.

A further object of the invention is to provide a device of the above-mentioned character which is simple and durable in construction, reliable and efficient in use and inexpensive to manufacture.

Other objects and advantages of the invention will be apparent during the course of the following description.

In the accompanying drawing, forming a part of this specification and in which like numerals are employed to designate like parts throughout the same, Fig. 1 is a side elevation view of the watering device, with parts broken away, and, Fig. 2 is a fragmentary top plan view with parts broken away.

In the drawing, wherein for the purpose of illustration, I have shown a preferred embodiment of my invention, the numeral 5 denotes a metal tray or pan. A frame 6 having one side covered with a sheet of foraminous material 7, secured to the edges of the frame by staples 8, is adapted to fit over the top of the pan, forming a platform on which the chicks can stand while drinking from the water fount 9, shown in dotted lines, in Fig. 1, which may be of any conventional type. The water fount is disposed centrally of the platform and between the platform and bottom of the pan is disposed a ring 10, also constructed of foraminous material, which serves as a support for the water fount and prevents the platform from sagging.

In use, it will be seen that the chicks in order to drink from the water fount 9 must stand upon the platform which prevents them from scratching dirt and litter into the fount and the water which they spatter while drinking passes through the foraminous material 7, into the pan 5, so that the chicks will not get their feet wet. The water which is spattered is retained in the pan and when it is desired to empty the same, the frame 6 may be readily lifted from the top of the pan.

It is to be understood that the form of my invention herewith shown and described is to be taken as a preferred example of the same and that certain changes in the shape, size and arrangement of the parts may be made without departing from the spirit of the invention or the scope of the subjoined claim.

Having thus described my invention, I claim:

A poultry watering device comprising a shallow pan, a platform consisting of a frame adapted to fit over the edges of said pan, having a sheet of foraminous material attached to one side of the frame in covering relation to said pan, said platform being adapted to support a watering fount in the center thereof, and a circular band of foraminous material disposed between said platform and the bottom of said pan at the center thereof.

In testimony whereof I affix my signature.

MARY T. SUEPER.